Aug. 25, 1942.  J. C. TRAVILLA, JR  2,293,925
RAILWAY TRUCK STRUCTURE
Filed Aug. 8, 1940   2 Sheets-Sheet 1
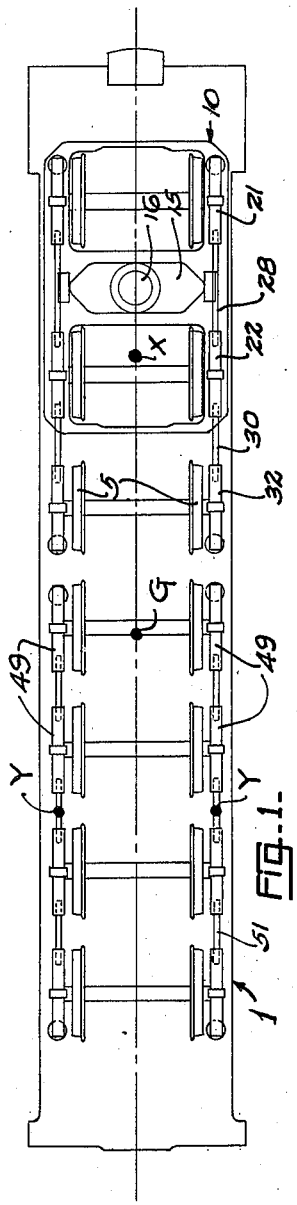
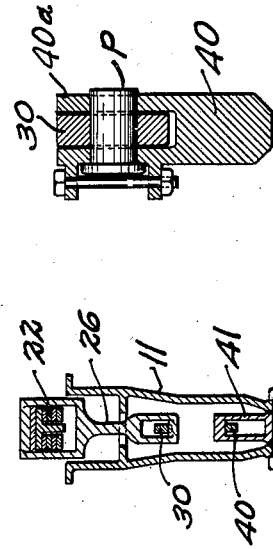
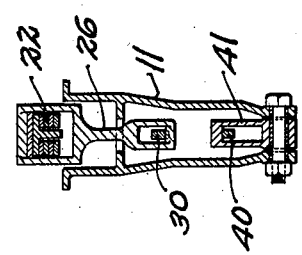
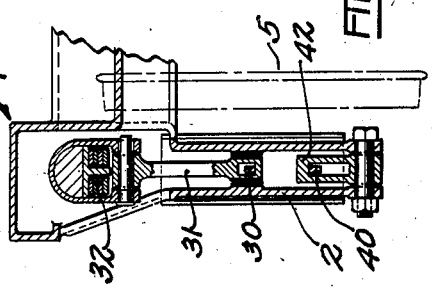
INVENTOR:
JAMES C. TRAVILLA JR.
BY
*Rodney Bedell*
ATTORNEY Aug. 25, 1942.　　J. C. TRAVILLA, JR　　2,293,925
RAILWAY TRUCK STRUCTURE
Filed Aug. 8, 1940　　2 Sheets-Sheet 2

INVENTOR:
JAMES C. TRAVILLA JR.
BY Rodney Bedell
ATTORNEY

Patented Aug. 25, 1942

2,293,925

UNITED STATES PATENT OFFICE 2,293,925

RAILWAY TRUCK STRUCTURE

James C. Travilla, Jr., University City, Mo., assignor to General Steel Castings Corporation, Granite City, Ill., a corporation of Delaware Application August 8, 1940, Serial No. 351,867

11 Claims. (Cl. 105—82)

The invention relates to railway rolling stock and more particularly to an equalized spring structure for supporting the vehicle body from the running gear. The invention is particularly adapted for use in relatively large capacity vehicles, such as locomotive tenders which include a series of wheeled axles journalled in the vehicle body and a swiveling truck pivotally supporting one end portion of the body at its longitudinal center.

One object of the invention is to provide a three point equalized spring support for the vehicle body upon the running gear with increased stability over spring systems previously employed.

Another object is to provide equalization between the springs on an axle journalled in the vehicle body frame, or underframe, and the springs of a swivel truck supporting the underframe.

Another object is to provide an equalizing arrangement between a swiveling truck at one end of the vehicle and an adjacent axle mounted in the body so that the upward forces acting on the truck frame at its sides due to loads transmitted through the truck equalization will be balanced at front and rear of truck frame thereby preventing undue tilting of the truck frame in a longitudinal vertical plane.

Another object is to utilize the equalizing structure between truck and the adjacent axle of the vehicle frame as a centering device to provide resistance to swiveling action of the truck and return it to normal position.

Another object is to provide an equalization system for a vehicle body frame which will not be excessively long, by equalizing part of the truck spring rigging with part of the spring rigging of the fixed body wheels, thereby reducing the length of the spring rigging systems of the remaining fixed body wheels.

These and other objects as will appear below are attained by the structure illustrated in the accompanying drawings in which:

Figure 1 is a diagrammatic plan view of a railway locomotive tender underframe supported at its forward end by a four-wheel swiveling truck and rearwardly of the truck by a series of wheeled axles journalled in the tender underframe.

Figure 2 is a diagrammatic side elevation of the structure illustrated in Figure 1.

Figures 5, 6 and 7 are vertical transverse detail sections taken on the corresponding section lines of Figure 4.

Figure 3:
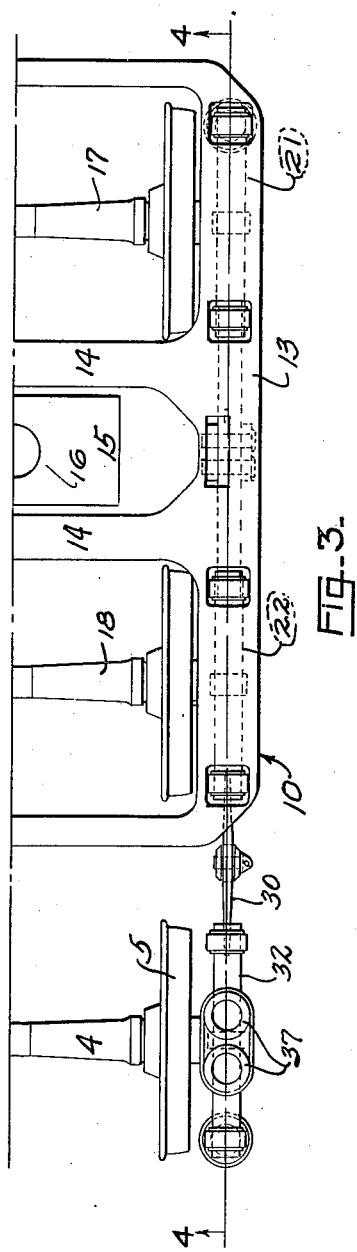
Figure 3 is a top view of one longitudinal half of the four-wheel truck and the adjacent wheeled axle journalled in the underframe and indicating the spring equalizing system for these parts, the tender underframe being removed to more clearly illustrate the structure below.
Figure 4:
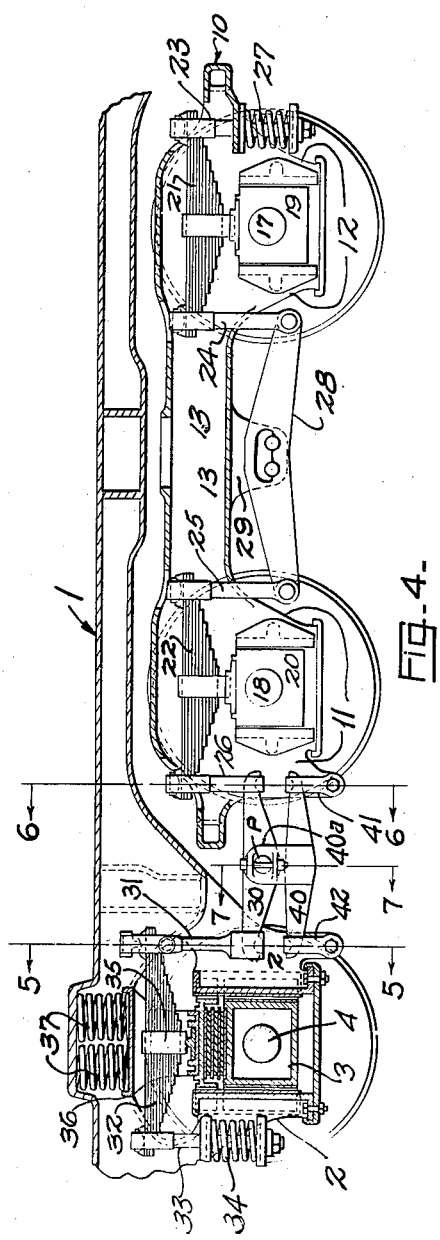
Figure 4 is a vertical longitudinal section and view taken approximately on the line 4—4 of Figure 3 and showing the tender underframe.

The tender underframe is shown at 1 and may consist of any desired construction but is indicated in Figure 4 as being of a one-piece cast metal structure including depending pedestal legs 2 which slidably receive between them the journal box 3 on the end of an axle 4 mounted on wheels 5. Beneath one end of underframe 1 is a four-wheel truck including a frame 10 with depending pedestal legs 11 and 12, wheel pieces 13, and transoms 14. A lateral motion bolster 15 is carried by transoms 14 by rockers, rollers, or swing hangers (not shown) in any well-understood manner and includes a center plate 16 upon which the adjacent portion of underframe 1 is supported at its longitudinal center.

Axles 17 and 18 mount journal boxes 19 and 20 which carry leaf springs 21 and 22 extending longitudinally of the vehicle and at their opposite ends carry links 23, 24, 25 and 26 respectively. Link 23 is anchored, through a coil spring 27, to the right hand end of the truck frame. Links 24 and 25 are pivotally connected respectively to the opposite ends of an equalizer 28 pivoted intermediate its ends to brackets 29 depending from wheel piece 13. Link 26 pivotally supports one end of an equalizing bar 30, the other end of which is similarly supported by a link 31 from the end of a spring 32 comprising leaves held assembled by a band 35 and carried on journal box 3 and extending longitudinally of the truck beyond the sides of the box and having its opposite end anchored to underframe 1 by a link 33 and a coil spring 34. Each journal box 3 mounts a saddle 36 for coil springs 37 providing additional spring support for the underframe but being relatively unimportant for the purposes of the present invention. Another equalizing bar 40 extends substantially parallel with and below equalizing bar 30 and has its ends pivotally connected by links 41 and 42 respectively to the lower portions of the adjacent pedestal legs 11 and 2.

Bars 30 and 40 are pivotally connected between their ends by a pin P extending through lever 30 and upstanding ears 40a on lever 40 (Figure 7).

The construction just described distributes the loads to the axles through the springs 21, 22 and 32 at one side of the vehicle and, with bolster 15, provides an equalized spring system extending to both sides of the truck and vehicle body, the center of which system is approximately at the point indicated at X in Figure 1.

A number of wheeled axles 45, 46, 47 and 48 are journalled in underframe 1 at the rear or left hand side of axle 4, and each of these axles carries leaf springs 49 in supporting relation to the corresponding sides of the underframe through links 50 connected to equalizers 51, pivoted on the underframe, and end links 52 yieldingly anchored to the frame, all in a well-known manner. Each series of springs, links and equalizers at one side of the vehicle forms a spring system, the center of which is approximately at the point Y indicated in Figure 1.

Series of frame supporting springs equalized as just described have been used satisfactorily heretofore on railway vehicles, but with increased capacity and length of tenders and the corresponding increase in the number of axles journalled in the tender frame and having all their springs equalized, the efficiency of the equalizing system is reduced because the longer the system the more difficult it is to keep the parts in horizontal alignment. By separating the springs carried by the forward frame journalled axle from the other similarly carried springs, the centers of spring support, indicated at Y, are positioned nearer to the rear end of the vehicle and farther away from the center of gravity of the vehicle load, indicated at G, than they would be if all of the springs at one side of the vehicle were in one equalizing system. Hence the longitudinal stability of the vehicle is increased over what it would be if the springs of the fifth axle were included in the series.

A further advantage of the connection of truck axle springs 21 and 22 with the vehicle axle spring 32 is that when the vehicle is on curved track the links 31, 26, 41 and 42 for equalizers 30 and 40 must incline from the vertical, longitudinally of the vehicle, to permit angular movement between the truck and underframe in a horizontal plane, and such movement will be accompanied by a spring distortion so that springs 22 and 32 act through these links as a centering device tending to return the truck to its normal position. This would decrease the amount of lateral resistance required of the bolster due to the entering and leaving of curved track, but such movement of the double equalizer links will have little or no effect upon the functioning of the spring equalization.

It will be understood that the two part equalizer is necessary to balance the loads on the truck frame. The upward force on the link 41 at the rear end of the truck frame will balance the upward force on the link 23 at the front end of the truck frame.

All of the objectives referred to in the introductory portion of the specification are attained by the structure described, but it will be understood that the details of this structure may be changed substantially without departing from the spirit of the invention and the exclusive use of such modifications as come within the scope of the claims is contemplated.

What is claimed is:

1. In a railway vehicle, a body frame having depending pedestal elements at one side, a wheeled axle journalled between said pedestal elements, a spring carried by said axle, a swiveling truck including a frame pivotally supporting said body frame at its longitudinal center line and having depending pedestal elements at one side and adjacent to said body frame pedestal elements, a wheeled axle journalled between said truck pedestal elements, a spring carried by said truck axle, an equalizing bar with its ends supported from said springs respectively, an equalizing bar extending substantially parallel to and below said first mentioned equalizing bar and having its ends connected to the lower portions of the adjacent pedestal elements of said body frame and truck respectively, and a member pivotally connecting said bars between their ends, said bars and member being arranged to distribute the load to said axles.

2. In a railway vehicle, a body frame having a pedestal at one side, a wheeled axle journalled in said pedestal, a spring carried by said axle and extending longitudinally of the vehicle towards opposite sides of said axle, one end of said spring being anchored to said body frame, a four-wheel truck including a frame pivotally supporting said body frame at its longitudinal center line and including depending pedestals at one side, wheeled axles journalled in said truck frame pedestals, springs on said truck axles extending longitudinally of the vehicle towards opposite sides of their respective axles, an equalizing bar pivoted to said truck frame between said truck springs and having its ends supported by the adjacent ends of said truck springs, the other end of the truck spring remote from said first-mentioned body spring being anchored to said truck frame, an equalizing bar having its ends supported by the adjacent ends of the other of said truck springs and the vehicle axle spring, an equalizing bar pivotally supported by said last-mentioned bar and having its ends in supporting relation to the adjacent underframe and truck pedestal respectively, whereby said springs and bars distribute the loads to said axles.

3. In a railway locomotive tender, a body frame, a multispring-carried truck having a swiveling connection to the body frame forming a pivotal support for one end of the body frame at its longitudinal center line, said support providing the sole support of the body frame on the truck, a series of axle carried springs and equalizing means supporting each side of the other end portion of the body frame, an axle carried spring on each side of the tender supporting the middle portion of the body frame, and equalizing means between each of said latter springs and said truck springs at the same side of the tender independently of the individual equalizing means for the springs of said series.

4. In a railway vehicle, a body frame, supporting structure therefor including a spring unit comprising a series of wheel-supported springs and equalizers at one side of the body frame, the ends of the series being anchored to the body frame, a corresponding unit at the opposite side of the body frame, a truck having a swiveling connection to the body frame forming a pivotal support for the body frame at its longitudinal center line at a point spaced from said units longitudinally of the vehicle, said support providing the sole support of the frame on the truck, and other units at opposite sides of the vehicle each comprising a series of wheel-carried springs and interconnecting equalizing levers, one spring of each of the latter-mentioned units being supported by an axle mounted in the body frame and another spring of each of the latter-mentioned units being mounted on a truck axle, one end of each latter-mentioned unit being anchored to the truck frame and the other end being anchored to said body frame independently of the other of the latter-mentioned units and of said first-mentioned wheel-supported springs.

5. In a railway vehicle, a body frame, a truck having a swiveling connection to the body frame forming a pivotal support for one end portion of the body frame at its longitudinal center line and including a truck frame and wheeled axles and springs supporting the truck frame from said axles, said support providing the sole support of the body frame on the truck, a series of wheeled axles journalled in said body frame, springs on said latter mentioned axles supporting the sides of the body frame spaced from said end portion, the truck springs at each side of the truck being equalized with the corresponding springs on the nearest of the axles journalled in the body frame and independently of the springs on the other axles journalled in the body frame, and the springs at each side of the body frame and carried on said latter-mentioned group of axles being equalized independently of the truck axle springs and the body axle spring adjacent thereto.

6. In a railway locomotive tender, a body frame, a supporting unit for one end portion of the body frame comprising a truck having a swiveling connection to the body frame forming a pivotal support for said frame at its longitudinal center line and including wheeled axles, said support providing the sole support of the body frame on the truck, a supporting unit for the portion of the body frame adjacent to said end portion and comprising a wheeled axle journalled in the body frame, and a supporting unit for the remaining portion of the body frame and comprising wheeled axles journalled in the body frame, individual spring structure on the axles of each of said units, the springs of said first two mentioned units forming parts of an equalizing system anchored at its ends to said truck frame and body frame respectively, and the springs of said third-mentioned unit forming an equalized series anchored at its ends to said body frame.

7. In a railway locomotive tender, a body frame, a supporting unit for an end portion of said body frame comprising a truck having a swiveling connection to the body frame forming a pivotal support for the body frame at the longitudinal center line, said support providing the sole support of the body frame on the truck, a supporting unit comprising a wheeled axle journalled in the body frame, and a supporting unit comprising a series of wheeled axles journalled in the body frame, each of said units inculding individual springs, the springs of said first two mentioned units being connected to each other by equalizers, and the springs in said unit having a series of wheels at one side of the vehicle being connected to each other by equalizers with the ends of the series anchored to the body frame independently of the corresponding series of springs at the other side of the vehicle.

8. In a railway vehicle, relatively movable frames, wheeled axles journalled in said frames, individual spring units carried by said axles and extending longitudinally of the vehicle with their remote ends anchored to the respective frames, a member extending between and having its ends secured to said frames so as to pivot freely relative thereto in a vertical plane, an equalizer having its opposite ends carried respectively by the adjacent ends of spring units individual to said frames, and means carried by said equalizer and pivotally supporting said member between the ends of the latter.

9. In a railway vehicle, a body frame having pedestals, a wheeled axle journalled in said pedestals, a spring unit carried by said axle and extending longitudinally of the vehicle with one end anchored to said frame, a truck including a frame supporting said body frame and having pedestals, a wheeled axle journalled in said latter-mentioned pedestals, a spring unit carried by said truck axle and extending longitudinally of the vehicle with one end anchored to said truck frame, a bar having its opposite ends respectively pivotally connected to adjacent pedestals of said body frame and truck frame, a bar having its ends respectively connected to the adjacent ends of said body axle and truck axle spring units, and means supporting said first-mentioned bar by said second-mentioned bar whereby the action of said spring units and bars distributes a load on said frame to both of said axles.

10. A structure as described in claim 2 in which the connections between the equalizing bars and the pedestals and springs provide for angular movement of the bars transversely of the vehicle as well as vertically to accommodate pivotal action of the truck about its support for the body frame.

11. In a railway vehicle, a body frame, a truck frame pivotally connected to an end portion of said body frame on the longitudinal center line of the latter, a wheeled axle journalled in said body frame adjacent to the inner end portion of said truck frame, a wheeled axle journalled in said truck frame, springs on said axles at each side of the vehicle, said springs at each side of the vehicle being connected to the body frame and truck frame respectively and having an equalizer between them, all of said springs and equalizers and said truck frame forming a single spring unit support for said body frame on its longitudinal center line at one end portion of said body frame, additional wheeled axles journalled in said body frame and spaced from said first-mentioned wheeled axles, and equalized spring units carried by said additional axles at opposite sides of said body frame and anchored thereto independently of each other to provide spring supports for said body frame at the sides thereof and spaced longitudinally of the vehicle from said first-mentioned spring support.

JAMES C. TRAVILLA, JR.